(12) United States Patent
Hsieh

(10) Patent No.: US 10,091,536 B2
(45) Date of Patent: Oct. 2, 2018

(54) METHOD FOR TRANSMITTING AN ON-DEMAND VIDEO FILE

(71) Applicant: VIVOTEK INC., New Taipei (TW)

(72) Inventor: Kuo-Yeh Hsieh, New Taipei (TW)

(73) Assignee: VIVOTEK INC., New Taipei (TW)

( * ) Notice: Subject to any disclaimer, the term of this patent is extended or adjusted under 35 U.S.C. 154(b) by 78 days.

(21) Appl. No.: 15/458,998

(22) Filed: Mar. 15, 2017

(65) Prior Publication Data

US 2017/0272786 A1 Sep. 21, 2017

(30) Foreign Application Priority Data

Mar. 16, 2016 (TW) .............................. 105108082 A

(51) Int. Cl.
*H04N 21/234* (2011.01)
*H04N 21/4147* (2011.01)
*H04N 21/433* (2011.01)
*H04N 21/44* (2011.01)
*H04N 21/472* (2011.01)
*H04N 21/8543* (2011.01)

(52) U.S. Cl.
CPC ....... *H04N 21/234* (2013.01); *H04N 21/4147* (2013.01); *H04N 21/4334* (2013.01); *H04N 21/44* (2013.01); *H04N 21/47202* (2013.01); *H04N 21/8543* (2013.01)

(58) Field of Classification Search
None
See application file for complete search history.

(56) References Cited

U.S. PATENT DOCUMENTS

| | | | | |
|---|---|---|---|---|
| 2005/0071491 A1* | 3/2005 | Seo | .................... | H04N 7/17318 709/231 |
| 2011/0307545 A1* | 12/2011 | Bouazizi | .......... | H04N 21/23434 709/203 |
| 2012/0054370 A1* | 3/2012 | Tsubakihara | ........ | G06F 17/3012 709/246 |
| 2012/0158802 A1* | 6/2012 | Lakshmanan | .... | H04N 21/85406 707/822 |
| 2012/0237026 A1* | 9/2012 | Sato | ....................... | H04N 5/783 380/200 |
| 2013/0125187 A1* | 5/2013 | Kim | ................. | H04N 21/23608 725/109 |

(Continued)

FOREIGN PATENT DOCUMENTS

CN 104661058 A 5/2015

*Primary Examiner* — Alexander Q Huerta
(74) *Attorney, Agent, or Firm* — Winston Hsu

(57) ABSTRACT

A user terminal transmits a transmission instruction including an initial time of a first video file to a network node. The network node generates a header of the on-demand video file according to the header of the first video file. The network node fetches a plurality of corresponding video samples from the media data box of the first video file according to the instruction and the media data box of the first video file. The network node fetches corresponding metadata of the video samples from the movie box of the first video file. The network node generates a movie box of the on-demand video file according to the corresponding metadata of the video samples. The network node transmits the header, the video samples and the movie box of the on-demand video file to the user terminal.

9 Claims, 5 Drawing Sheets

(56) References Cited

U.S. PATENT DOCUMENTS

| | | | |
|---|---|---|---|
| 2013/0147914 A1* | 6/2013 | Park | H04N 21/23614 |
| | | | 348/43 |
| 2013/0167184 A1* | 6/2013 | Hong | H04H 60/82 |
| | | | 725/109 |
| 2014/0325020 A1* | 10/2014 | Igarashi | H04N 21/23406 |
| | | | 709/217 |
| 2015/0085917 A1* | 3/2015 | Hendry | H04N 21/234 |
| | | | 375/240.02 |
| 2015/0089560 A1* | 3/2015 | Park | H04L 65/607 |
| | | | 725/116 |
| 2015/0193494 A1* | 7/2015 | Malamal Vadakital | |
| | | | H04N 21/85 |
| | | | 707/697 |
| 2015/0215359 A1* | 7/2015 | Bao | H04L 65/605 |
| | | | 709/219 |
| 2017/0230436 A1* | 8/2017 | Rhyu | H04L 65/4084 |
| 2018/0020268 A1* | 1/2018 | Denoual | H04N 21/234327 |

* cited by examiner

METHOD FOR TRANSMITTING AN ON-DEMAND VIDEO FILE

BACKGROUND OF THE INVENTION

1. Field of the Invention

This invention relates to a method for transmitting an on-demand video file, especially relates to a method for transmitting an on-demand video file that is able to reduce the loading of both the network transmission and the memory space.

2. Description of the Prior Art

In the prior art, the download function provided by the storage system on the internet can only support the download of one complete video file. Therefore, the user is not able to download only part of the content in one video file, and is not able to download different video files as an integral at once. For example, if the user needs only part of the content in one video file, the user has to download the whole video file and retrieve the required content from the complete video file by other video editing applications. However, this approach may jam up the network by occupying the bandwidth with unnecessary content and increase the need for a bigger storage space in the user side.

In addition, in some circumstances, when reviewing the surveillance video, the required surveillance content may be distributed in different video files recorded by different surveillance cameras. In this case, the user has to download all the video files having the required content and has to combine the required contents collected from the different video files to generate the required video file, wasting the bandwidth of the network and the space of the storage in the user side. Furthermore, the effort for editing the video files can also frustrate the user.

SUMMARY OF THE INVENTION

One embodiment of the present invention discloses a method for transmitting an on-demand video file. The method includes a user terminal transmitting a first transmission instruction comprising a first initial time of a first video file to a network node, the network node generating a file type box (ftyp) of an on-demand video file according to a first file type box of the first video file when receiving the first transmission instruction, the network node fetching a plurality of first video samples corresponding to a time period from the first initial time to a first specific time from a first media data box (mdat) of the first video file according to the first transmission instruction and a first movie box (moov) of the first video file, the network node fetching metadata corresponding to the plurality of first video samples from the first movie box of the first video file, the network node generating a movie box of the on-demand video file according to the metadata corresponding to the plurality of first video samples, the network node transmitting the file type box of the on-demand video file, the plurality of first video samples, and the movie box of the on-demand video file by a network communication protocol, and the user terminal receiving the file type box of the on-demand video file, the plurality of first video samples, and the movie box of the on-demand video file for combining the on-demand video file. The first video file supports a Moving Picture Experts Group-4 Part 14 (MP4) standard.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
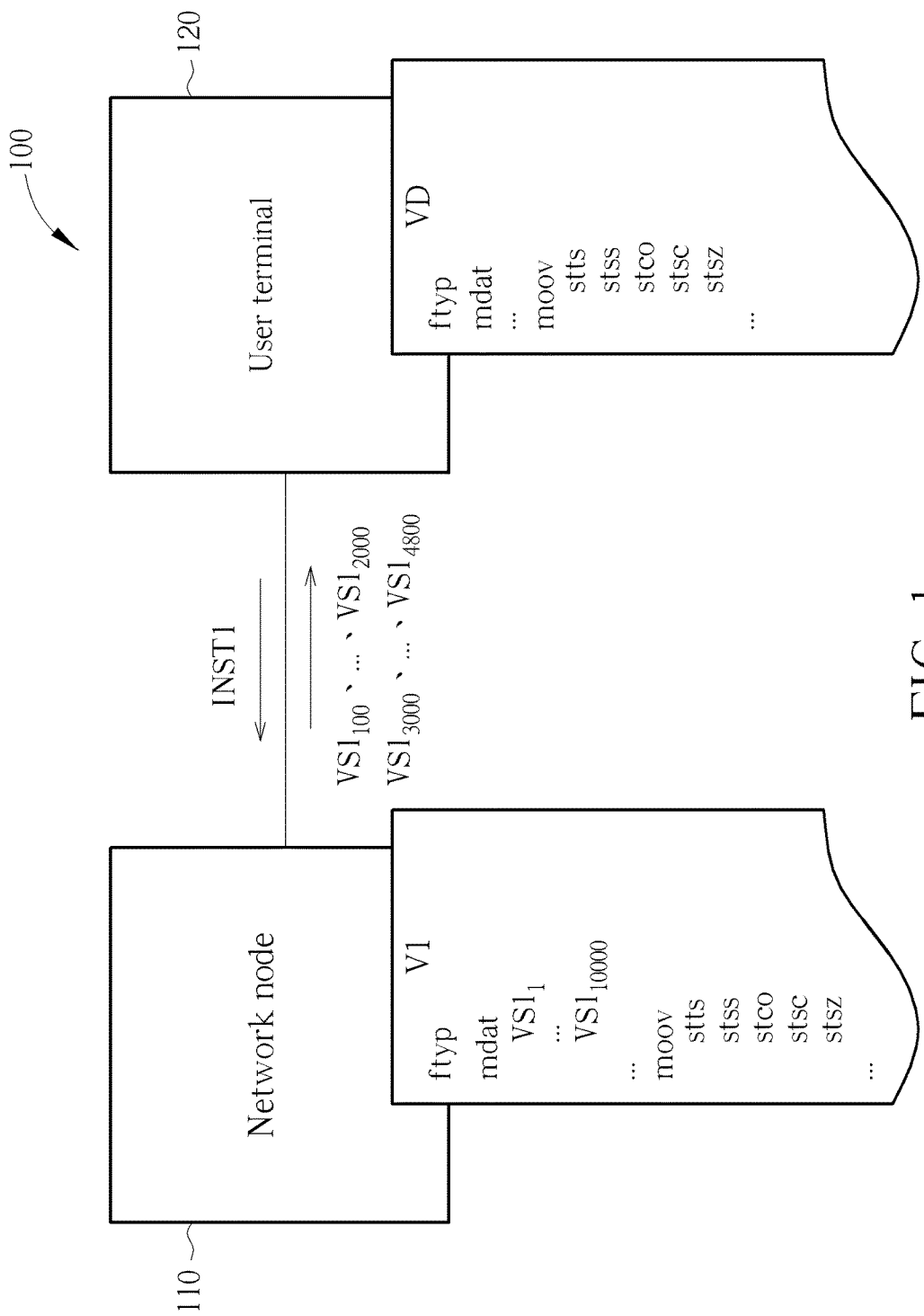
FIG. 1 shows an on demand video transmission system according to one embodiment of the present invention.

FIG. 1 shows an on demand video transmission system 100 according to one embodiment of the present invention. The on demand video transmission system 100 includes a network node 110 and a user terminal 120. The network node 110 and the user terminal 120 can be connected through the internet. The network node 110 can be a camera, a server, a network video recorder (NVR), or a network attached storage (NAS) having the network connection function. The user terminal 120 can be a computer system having the network connection function, such as a personal computer, a smart phone, or a tablet.

In FIG. 1, the network node 110 stores a first video file V1, however, in some embodiments of the present disclosure, the first video file V1 can also be stored in a storage device having an electrical connection with the network node 110, or a storage device having a network connection with the network node 110.

In some embodiments, the first video file V1 can support a Moving Picture Experts Group-4 Part 14 (MP4) standard. According to the MP4 standard, the video file can include different boxes storing different types of information, such as the file type box (ftyp), the media data box (mdat), and the movie box (moov). The file type box of the video file can be seen as the header of the video file and can record the version of the video file. Since the video file of a new version can support new functions while the video file of an old version may not, the decoding process is performed according to the version recorded in the file type box, avoiding false operations. The media data box (mdat) includes the media information of the video, such as the video sample of each frame. The movie box (moov) includes the information required when playing the video, such as the length of the video, the frame rate, the access point of each video sample, the playing time of each video sample, etc.

When the user selects parts of the content in the first video file V1 to be the on-demand video file VD, the user can transmit the first transmission instruction INST1 to the network node 110 by the user terminal 120. The first transmission instruction INST1 can include a first initial time and a first specific time of the first video file V1 related to the content required by the user. For example, if the first video file V1 has a total length of 3000 seconds and the user needs only the content started from the $30^{th}$ second to the $500^{th}$ second of the first video file V1, then the first initial time described in the first transmission instruction INST1 would be the $30^{th}$ second and the first specific time described in the first transmission instruction INST1 may be the termination time, that is, the $500^{th}$ second. However, in some embodiments, the user may only assign the initial time of the required content without assigning the termination time. In this case, the first specific time can be related to the time of the last frame of the first video file V1 by default.

When receiving the first transmission instruction INST1, the network node 110 can generate the file type box of the on-demand video file VD according to the first file type box of the first video file V1. In some embodiments, the version of the file type box of the on-demand video file VD can be the same as the version of the first file type box of the first video file V1.

In addition, the network 110 can fetch a plurality of first video samples corresponding to a time period from the first initial time to the first specific time from the first media data box of the first video file V1 according to the first transmission instruction INST1 and the first movie box of the first video file V1.

According to the MP4 standard, the movie box of a video file includes different sub boxes, such as the time to sample box (stts), the sync sample table box (stss), the chunk offset box (stco), the sample to chunk box (stsc), the sample size box (stsz), and so on.

Since the display time of each video sample may be different from each other, the time to sample box (stts) can record the display time of each video sample. According to the first initial time and the first specific time, the initial sample serial number corresponding to the first initial time and the termination sample serial number corresponding to the first specific time can be obtained by calculation. For example, the first initial time can be the $30^{th}$ second, the first specific time can be the $500^{th}$ second, and the first media data box can include the first video samples numbering from 1 to 10000, that is, the first video samples $VS1_1$ to $VS1_{10000}$. If the total display time of first video samples $VS1_1$ to $VS1_{99}$ with sample serial numbers 1 to 99 is 29.5 seconds, and the total display time of first video samples $VS1_1$ to $VS1_{100}$ with sample serial numbers 1 to 100 is 30.2 seconds, then the first video sample corresponding to the $30^{th}$ second can be identified as the video sample with sample serial number 100. Similarly, if the total display time of first video samples $VS1_1$ to $VS1_{1999}$ with sample serial numbers 1 to 1999 is 499.8 seconds and the total display time of first video samples $VS1_1$ to $VS1_{2000}$ with sample serial numbers 1 to 2000 is 500.2 seconds, then the first video sample corresponding to the $500^{th}$ second can be identified as the video sample with sample serial number 2000. In this case, the network node 110 can fetch the first video samples $VS1_{100}$ to $VS1_{2000}$ corresponding to the first initial time and the first specific time from the first media data box of the first video file V1.

To consider with playing the on-demand video file, the sync sample table box (stss) is functional to fetch the first frame of the on-demand video file VD could be played. The sync sample table box (stss) records the sample serial number of the critical frame, or the so called I-frame. When decoding the I-frame, no other reference frame is required, so the first frame of the on-demand video file VD should be a sync sample (I-frame). For example, the first video sample $VS_{100}$ corresponding to the first initial time at the $30^{th}$ second may not be the sync sample (I-frame), and, thus, cannot be played as the first frame of the on-demand video file VD. In this case, a sync sample with a sample serial number closest to the sample serial number of the first video sample $VS_{100}$ may be chosen as the initial sample.

In addition, according to the MP4 standard, the video samples of a video file may be stored in different memory segments, that is, in different chunks. For example, the first video samples $VS1_{100}$ to $VS1_{999}$ may be stored in the first chunk while the first video samples $VS1_{1000}$ to $VS1_{2000}$ may be stored in the second chunk. The chunk offset box (stco) records the initial addresses of chunks, the sample to chunk box (stsc) records the number of samples in each chunk, and the sample size box (stsz) records the size of each sample.

The network node 110 can fetch at least one initial address of chunks corresponding to the first video samples $VS1_{100}$ to $VS1_{2000}$ according to the initial sample serial number, the termination sample serial number, and the chunk offset box (stco) of the first movie box. The network node 110 can fetch the initial address corresponding to the initial sample serial number and the termination address corresponding to the termination sample serial number from the first media data box according the initial addresses of chunks corresponding to the first video samples $VS1_{100}$ to $VS_{2000}$, the sample to chunk box (stsc) and the sample size box (stsz) of the first movie box of the first video file V1. Afterward, the network node 110 can fetch the first video samples $VS1_{100}$ to $VS1_{2000}$ corresponding to the time period from the first initial time to the first specific time from the first media data box of the first video file V1 according to the initial address corresponding to the initial sample serial number and the termination address corresponding to the termination sample serial number, and the network node 110 can generate the media data box of the on-demand video file VD according to the first video samples $VS1_{100}$ to $VS1_{2000}$.

In addition, in the present embodiment, the network node 110 can fetch the metadata corresponding to the first video samples $VS1_{100}$ to $VS1_{2000}$ from the first movie box of the first video file V1, and can generate the movie box of the on-demand video file VD according to the metadata corresponding to the first video samples $VS1_{100}$ to $VS1_{2000}$. That is, the network node 110 can combine the metadata corresponding to the first video samples $VS1_{100}$ to $VS1_{2000}$ to generate the movie box of the on-demand video file VD.

For example, the network node 110 can remove the data with its sample serial number before the initial sample serial number and after the termination sample serial number in the time to sample box (stts) of the first video file V1 to generate the time to sample box (stts) of the on-demand video file VD.

With the network communication protocol, such as the HyperText Transfer Protocol (HTTP), the network node 110 can transmit the file type box of the on-demand video file VD, the first video samples $VS1_{100}$ to $VS1_{2000}$, and the movie box of the on-demand video file VD to the user terminal 120.

In some embodiments, when the network node 110 fetches the first video sample $VS1_{100}$ of the first video samples $VS1_{100}$ to $VS1_{2000}$, the network node 110 can transmit the first video sample $VS1_{100}$ to the user terminal 120 immediately. While the network node 110 transmits the first video sample $VS1_{100}$ to the user terminal 120 by the network communication protocol, the network node 110 can keep fetching the rest of first video samples, such as the first video samples $VS1_{101}$ to $VS1_{2000}$, that have not been fetched yet. Furthermore, in some embodiments, the network node 110 can transmit the file type box of the on-demand video file VD first, and transmit the first video samples $VS1_{100}$ to $VS1_{2000}$ and the movie box of the on-demand video file VD successively. Also, the network node 110 can transmit the first video samples $VS1_{100}$ to $VS1_{2000}$ and generate the movie box of the on-demand video file VD in the same time.

Consequently, the network node 110 can generate and transmit the required data at the same time, saving the time for transmitting the on-demand video file VD to the user terminal 120.

When the user terminal 120 receives the file type box of the on-demand video file VD, the first video samples $VS1_{100}$ to $VS1_{2000}$, and the movie box of the on-demand video file VD, the user terminal 120 can combine the file type box of the on-demand video file VD, the first video samples $VS1_{100}$ to $VS1_{2000}$, and the movie box of the on-demand video file VD to generate the on-demand video file VD.

Since the network node 110 can generate the file type box and the movie box of the on-demand video file VD and fetch the first video samples $VS1_{100}$ to $VS1_{2000}$ according to the first transmission instruction INST1 issued by the user terminal 120, the network node 110 does not have to transmit the unrequired part of the first video file V1 and waste the bandwidth of the network, reducing the burden of network traffic. Also, since the network node 110 can generate the data and transmit the data at the same time, the time for transmitting the on-demand video file VD can be shortened while the network node 110 does not require additional memory space to save the temporary data of the on-demand video file VD. Therefore, the requirement for memory space can be reduced.

In some situations, the user may also require other parts of content in the first video file V1. In these cases, the network node 110 and the user terminal 120 can follow similar principles aforementioned to generate and transmit the on-demand video file. For example, the first transmission instruction INST1 transmitted by the user terminal 120 may further include a successive initial time and a successive specific time corresponding to the successive initial time related to the first video file V1.

In this case, the network node 110 can fetch a plurality of first video samples from the first media data box of the first video file V1 corresponding to a time period from the successive initial time to the successive specific time according to the successive initial time, the successive specific time, and the first movie box of the first video file V1. For example, if the successive initial time is the $1000^{th}$ second and the successive specific time is the $1500^{th}$ second, then the first video samples corresponding to the time period from the successive initial time to the successive specific time may have sample serial numbers from 3000 to 4800. Therefore, the network node 110 can fetch the first video samples $VS1_{3000}$ to $VS1_{4800}$ from the first media data box of the first video file V1, and the network node 110 can transmit the first video samples $VS1_{3000}$ to $VS1_{4800}$ to the user terminal 120 by the network communication protocol.

In addition, the network node 110 can further fetch the metadata corresponding to the first video samples $VS1_{3000}$ to $VS1_{4800}$ from the first movie box of the first video file V1 and combine the metadata corresponding to the first video samples $VS1_{100}$ to $VS1_{2000}$ and the metadata corresponding to the first video samples $VS1_{3000}$ to $VS1_{4800}$ to generate the movie box of the on-demand video file VD. After receiving the first video samples $VS1_{100}$ to $VS1_{2000}$, the first video samples $VS1_{3000}$ to $VS1_{4800}$, the file type box of the on-demand video file VD, and the movie box of the on-demand video file VD, the user terminal 120 can combine the received files to generate the on-demand video file VD.

Figure 2:
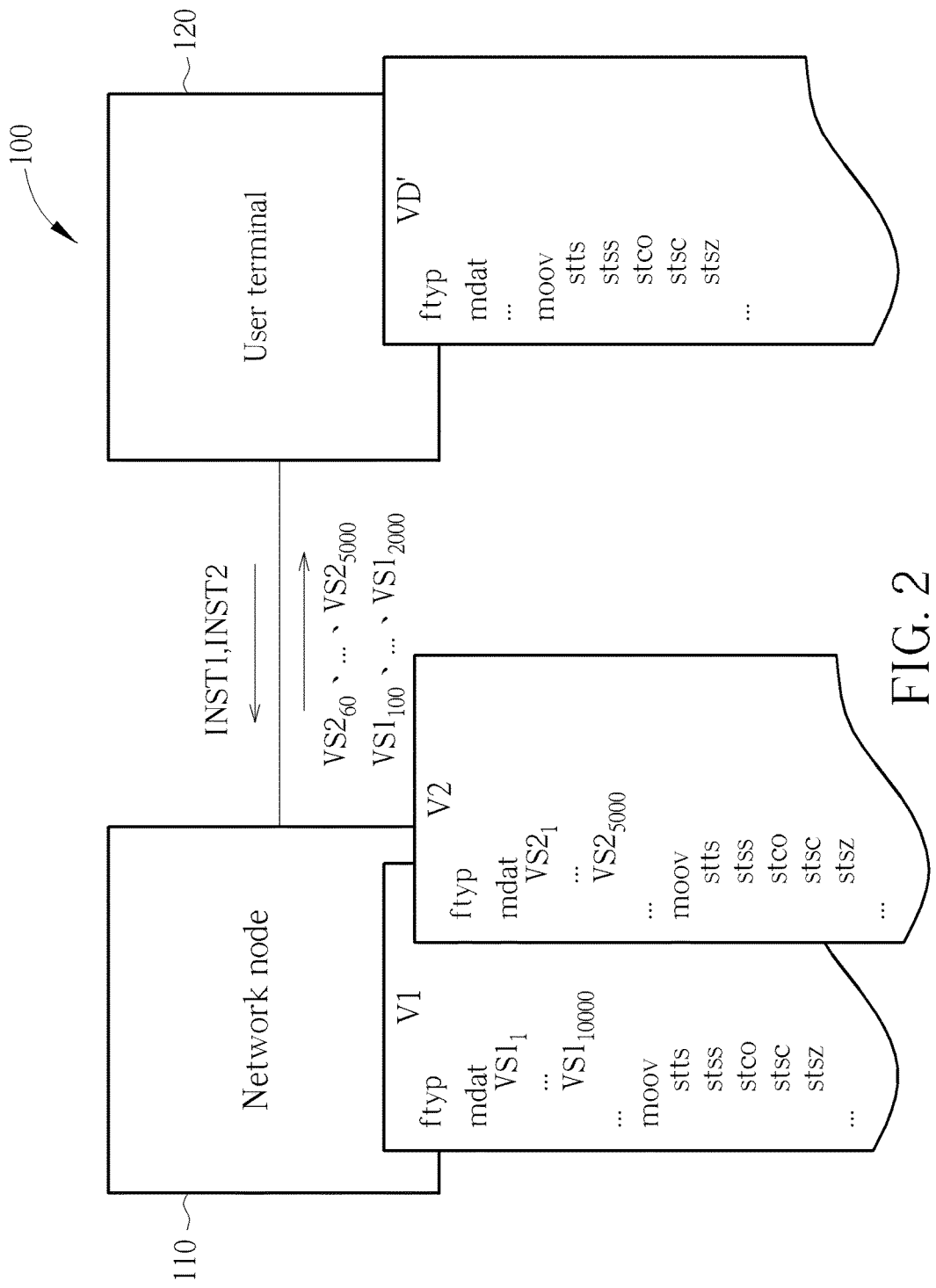
FIG. 2 shows a usage scenario of the on demand video transmission system of FIG. 1.

Furthermore, the user may need the content from other video files in addition to the first video file V1. In this case, the network node 110 and the user terminal 120 can still follow similar principles aforementioned to transmit the on-demand video file. FIG. 2 shows a usage scenario of the transmission system 100. In FIG. 2, if the user requests for parts of the content in a second video file V2 in addition to the content from the $30^{th}$ second to the $500^{th}$ second in the first video file V1, the user terminal 120 may further transmit a second transmission instruction INST2 to the network node 110. The second transmission instruction INST2 includes a second initial time of a second video file V2 and a second specific time corresponding to the second initial time. The second specific time can be related to a second termination time assigned by the user, however, if the user only assigns the initial time without assigning the termination time, the second specific time can be related to the time of the last frame in the second video file V2 by default.

In addition, in some embodiments, time period from the first initial time to the first specific time of the first transmission instruction INST1 received by the network node 110 may include video contents in a video file other than the first video file V1. In this case, the network node 110 may analyze the first transmission instruction INST1 to derive at least two sub instructions INST1' and INST2'. Once the two sub instructions INST1' and INST2 are derived after analyzing the first transmission instruction INST1, the same process as shown in FIG. 2 can be applied. For example, each of the two sub instructions INST1' and INST2' derived from the first transmission instruction INST1 may include a set of initial time and specific time. The initial time included in the sub instruction INST1' may be the first initial time of the first transmission instruction INST, and the specific time included in the sub instruction INST1' may be the time of the last frame in the first video file V1. Meanwhile, the initial time included in the sub instruction INST2' may be the time of the first frame in the second video file V2, and the specific time included in the sub instruction INST2' may be the first specific time of the first transmission instruction INST.

The second video file V2 and the first video file V1 can be stored in the same storage device, such as the network node 110, a storage device having an electrical connection with the network node 110, or a storage device having a network connection with the network node 110. However, in some embodiments, the second video file V2 and the first video file V1 can also be stored in different storage devices.

Since the version of the first video file V1 and the version of the second video file V2 may be different, the operations supported by the two video files V1 and V2 may be different. Therefore, when generating the file type box of the on-demand video file VD', the network node 110 may compare the first file type box of the first video file V1 and the second file type box of the second video file V2, and generate the file type box of the on-demand video file VD' according to the comparison result. The video file of a new version can usually support the operations for the previous version. Therefore, the network node 110 can compare the first version of the first file type box of the first video file V1 and the second version of the second file type box of the second video file V2. If the first version is different from the second version, the network node 110 can generate the file type box of the on-demand video file VD' according to the first file type box or the second file type box whichever has an older version. If the first version is the same as the second version, the network node 110 can generate the file type box of the on-demand video file VD' according to the first file type box or the second file type box.

Furthermore, the network node 110 can fetch a plurality of second video samples corresponding to a time period from the second initial time to the second specific time from the second media data box of the second video file V2 according to the second transmission instruction INST2 and the second movie box of the second video file V2. For example, the second initial time can be the $10^{th}$ second, the second specific time can be the time of the last frame in the second video file V2, and the second media data box may include the second video samples numbering from 1 to 5000, that is, the second video samples $VS2_1$ to $VS2_{5000}$. In this case, the network node 110 can calculate the sample serial numbers of the second video samples played during the period from the second initial time to the second specific time according to the display time of each video sample recorded in the time to sample box of the second movie box of the second video file V2. For example, the sample serial number can be 60 to 5000. Correspondingly, the network node 110 can fetch the second video samples $VS2_{60}$ to $VS2_{5000}$ corresponding to the time period from the second initial time to the second specific time according to the sample serial numbers calculated, and the information recorded in the chunk offset box (stco), the sample to chunk box (stsc), and the sample size box (stsz) of the second movie box of the second video file V2.

The network node 110 can further fetch the metadata corresponding to the second video samples $VS2_{60}$ to $VS2_{5000}$ from the second movie box of the second video file V2, and can generate the movie box of the on-demand video file according to the metadata corresponding to the first video samples $VS1_{100}$ to $VS1_{2000}$ and the metadata corresponding to the second video samples $VS2_{60}$ to $VS2_{5000}$. In some embodiments, the network node 110 can combine the metadata corresponding to the first video samples $VS1_{100}$ to $VS1_{2000}$ and the metadata corresponding to the second video samples $VS2_{60}$ to $VS2_{5000}$ to generate the movie box of the on-demand video file VD'.

For example, the network node 110 can remove the data with sample serial numbers less than the initial sample serial number and greater than the termination sample serial number in the time to sample box (stts) of the first video file V1 to derive the metadata corresponding to the first video samples $VS1_{100}$ to $VS1_{2000}$, remove the data with sample serial numbers less than the initial sample serial number and greater than the termination sample serial number in the time to sample box (stts) of the second video file V2 to derive the metadata corresponding to the second video samples $VS2_{60}$ to $VS2_{5000}$, and combine the derived metadata to generate the time to sample box (stts) of the on-demand video file VD'.

The network node 110 can transmit the file type box of the on-demand video file VD', the first video samples $VS1_{100}$ to $VS1_{2000}$, the second video samples $VS2_{60}$ to $VS2_{5000}$, and the movie box of the on-demand video file VD' by the network communication protocol. In the present embodiment, the network node 110 can transmit the file type box of the on-demand video file VD' first, and transmit the first video samples $VS_{100}$ to $VS1_{2000}$, the second video samples $VS2_{60}$ to $VS2_{5000}$, and the movie box of the on-demand video file VD' successively.

When the user terminal 120 receives the file type box of the on-demand video file VD', the first video samples $VS1_{100}$ to $VS1_{2000}$, the second video samples $VS2_{60}$ to $VS2_{5000}$, and the movie box of the on-demand video file VD', the user terminal 120 can combined the received data to generate the on-demand video file VD'.

Since the network node 110 can generate the file type box and the movie box of the on-demand video file VD' according to the transmission instruction INST1 and INST2 issued by the user terminal 120 and fetch the first video samples $VS1_{100}$ to $VS1_{2000}$ and the second video samples $VS2_{60}$ to $VS2_{5000}$ required by the user, the network node 110 does not have to transmit the unrequired part of the first video file V1 or the second video file V2 and waste the bandwidth of the network, reducing the burden of network traffic. Also, since the network node 110 can generate the data and transmit the data at the same time, the time for transmitting the on-demand video file VD' can be shortened while the network node 110 does not require additional memory space to save the temporary data of the on-demand video file VD'. Therefore, the requirement for memory space can be reduced.

Figure 3:
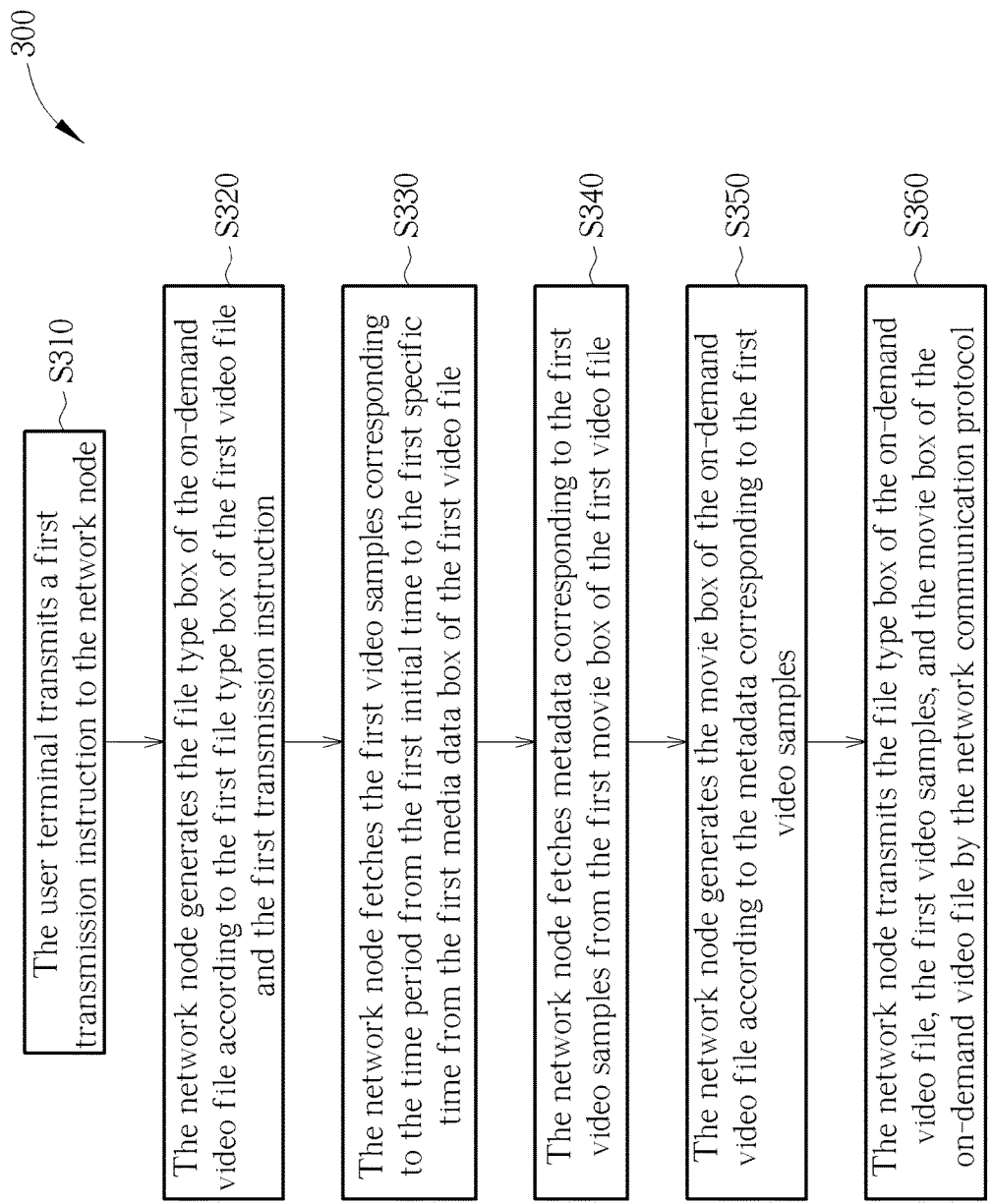
FIG. 3 shows a flow chart of a method for transmitting an on-demand video file according to one embodiment of the present invention.

FIG. 3 shows a flow chart of a method 300 for transmitting an on-demand video file VD. The method 300 can be applied to the on demand video transmission system 100. The method 300 includes steps S310 to S360, but the execution sequence of the method 300 is not limited to S310 to S360.

S310: the user terminal 120 transmits a first transmission instruction INST1 including the first initial time and a first specific time of the first video file V1 to the network node 110;

S320: the network node 110 generates the file type box of the on-demand video file VD according to the first file type box of the first video file V1 and the first transmission instruction INST1;

S330: the network node 110 fetches the first video samples $VS1_{100}$ to $VS1_{2000}$ corresponding to the time period from the first initial time to the first specific time from the first media data box of the first video file V1 according to the first transmission instruction INST1 and the first movie box of the first video file V1;

S340: the network node 110 fetches metadata corresponding to the first video samples $VS1_{100}$ to $VS1_{2000}$ from the first movie box of the first video file V1;

S350: the network node 110 generates the movie box of the on-demand video file VD according to the metadata corresponding to the first video samples $VS1_{100}$ to $VS1_{2000}$;

S360: the network node 110 transmits the file type box of the on-demand video file VD, the first video samples $VS1_{100}$ to $VS1_{2000}$, and the movie box of the on-demand video file by the network communication protocol.

Figure 4:
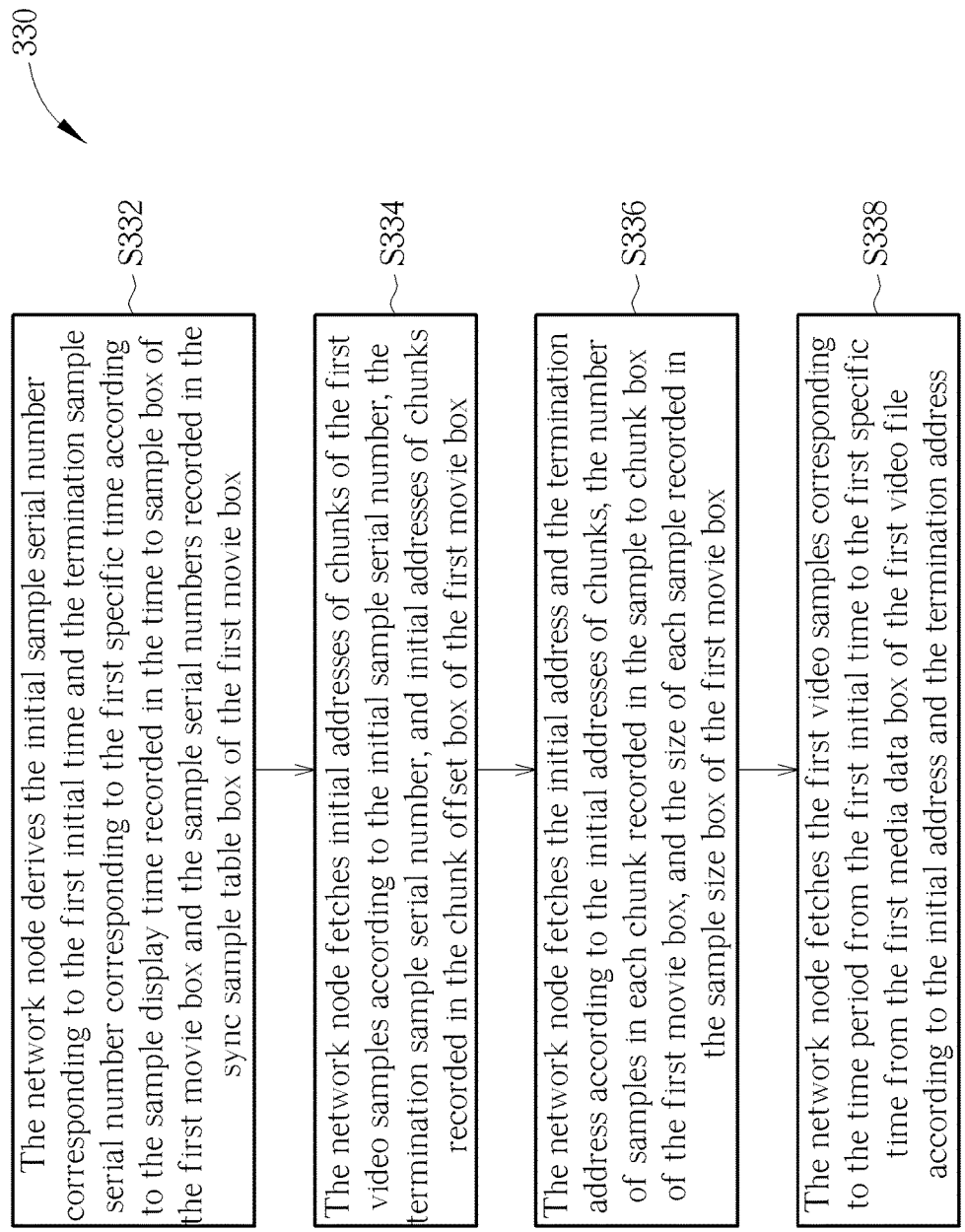
FIG. 4 shows the flow chart of part of the method of FIG. 3.

By method 300, the network node 110 can generate the file type box and the movie box of the on-demand video file VD and fetch the required first video samples, such as fetching the first video samples $VS1_{100}$ to $VS1_{2000}$ from the first video samples $VS1_1$ to $VS1_{10000}$, according to the first transmission instruction INST1 issued from the user terminal 120. In some embodiments, the step S330 can further includes steps S332 to S338. FIG. 4 shows the flow chart of the steps S332 to S338.

S332: the network node 110 derives the initial sample serial number corresponding to the first initial time and the termination sample serial number corresponding to the first specific time according to the sample display time recorded in the time to sample box of the first movie box and the sample serial numbers recorded in the sync sample table box of the first movie box;

S334: the network node 110 fetches initial addresses of chunks of the first video samples $VS1_{100}$ to $VS1_{2000}$ according to the initial sample serial number, the termination sample serial number, and initial addresses of chunks recorded in the chunk offset box of the first movie box;

S336: the network node 110 fetches the initial address corresponding to the initial sample serial number and the termination address corresponding to the termination sample serial number from the first media data box according the initial addresses of chunks, the number of samples in each chunk recorded in the sample to chunk box of the first movie box, and the size of each sample recorded in the sample size box of the first movie box;

S338: the network node 110 fetches the first video samples $VS1_{100}$ to $VS1_{2000}$ corresponding to the time period from the first initial time to the first specific time from the first media data box of the first video file V1 according to the initial address and the termination address.

In addition, in some embodiments, when the network node 110 receives a video sample, such as the first video sample $VS1_{100}$ of the first video samples $VS1_{100}$ to $VS1_{2000}$, the network node 110 can transmit the first video sample $VS1_{100}$ to the user terminal 120 immediately by the network communication protocol. Also, while the network node 110 transmits the first video sample $VS1_{100}$ to the user terminal 120 by the network communication protocol, the network node 110 can continue to perform steps S332 to S338 to fetch the rest of first video samples $VS1_{100}$ to $VS1_{2000}$ required.

When the user terminal 120 receives the file type box of the on-demand video file VD, the required first video samples $VS1_{100}$ to $VS1_{2000}$, and the movie box of the on-demand video file VD, the user terminal 120 can combine the received data to generate the on-demand video file VD.

With the method 300, the network node 110 does not have to transmit the unrequired part of the first video file V1 and waste the bandwidth of the network, reducing the burden of network traffic. Also, since the network node 110 can generate data and transmit data at the same time, the time for transmitting the on-demand video file VD can be shortened while the network node 110 does not require additional memory space to save the temporary data of the on-demand video file VD. Therefore, the requirement for memory space can be reduced.

Figure 5:
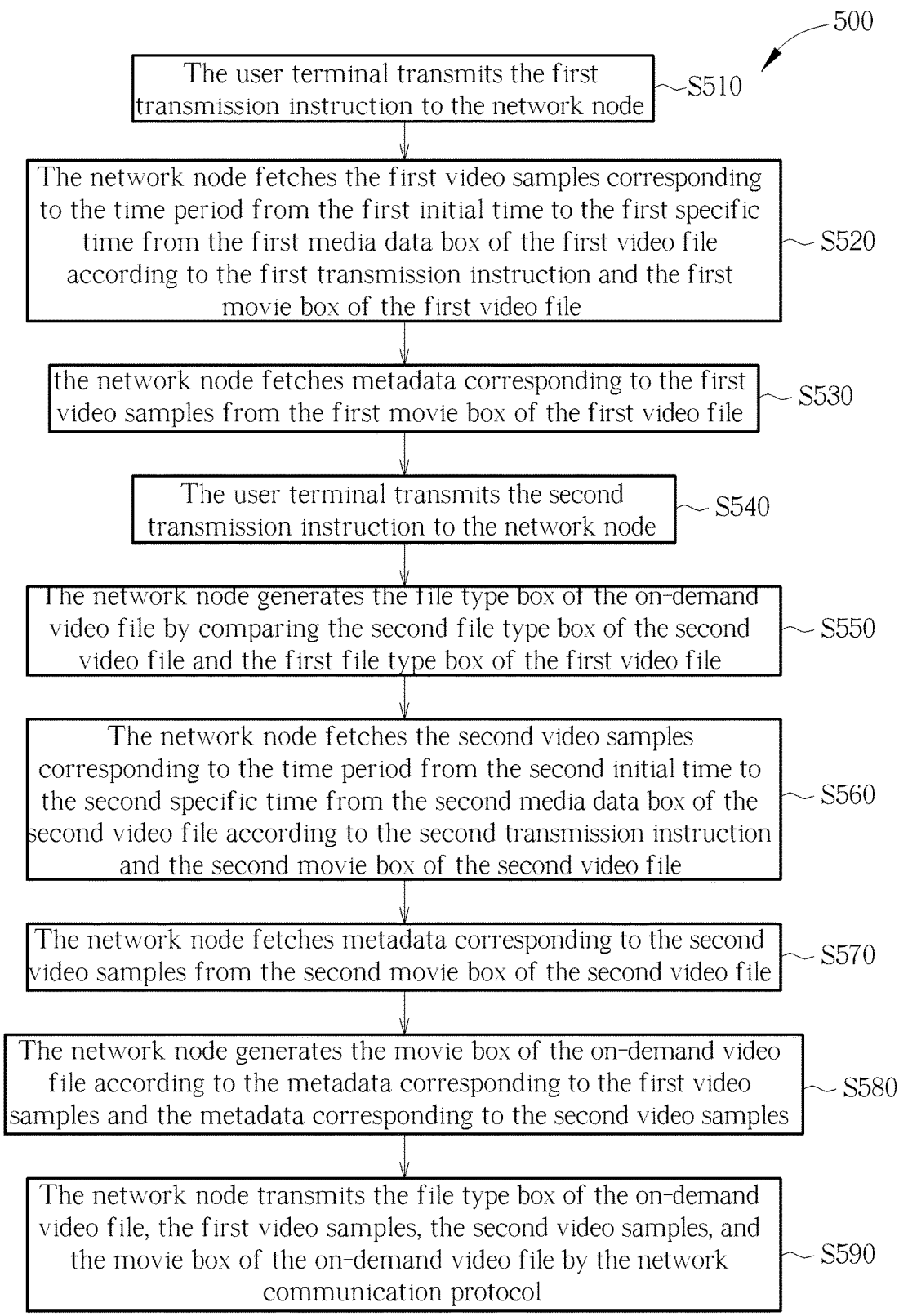
FIG. 5 shows a flow chart of a method for transmitting an on-demand video file according to another embodiment of the present invention.

FIG. 5 shows a flow chart of a method 500 for transmitting an on-demand video file VD'. The method 500 can be applied to the on demand video transmission system 100. The method 500 includes steps S510 to S590, but the execution sequence of the method 500 is not limited to S510 to S590.

S510: the user terminal 120 transmits the first transmission instruction INST1 including the first initial time and a first specific time of the first video file V1 to the network node 110;

S520: the network node 110 fetches the first video samples $VS1_{100}$ to $VS1_{2000}$ corresponding to the time period from the first initial time to the first specific time from the first media data box of the first video file V1 according to the first transmission instruction INST1 and the first movie box of the first video file V1;

S530: the network node 110 fetches metadata corresponding to the first video samples $VS1_{100}$ to $VS1_{2000}$ from the first movie box of the first video file V1;

S540: the user terminal 120 transmits the second transmission instruction INST2 including the second initial time of the second video file V2 to the network node 110;

S550: the network node 110 generates the file type box of the on-demand video file VD' by comparing the second file type box of the second video file V2 and the first file type box of the first video file V1;

S560: the network node 110 fetches the second video samples $VS2_{60}$ to $VS2_{5000}$ corresponding to the time period from the second initial time to the second specific time from the second media data box of the second video file V2 according to the second transmission instruction INST2 and the second movie box of the second video file V2;

S570: the network node 110 fetches metadata corresponding to the second video samples $VS2_{60}$ to $VS2_{5000}$ from the second movie box of the second video file V2;

S580: the network node 110 generates the movie box of the on-demand video file VD' according to the metadata corresponding to the first video samples $VS1_{100}$ to $VS1_{2000}$ and the metadata corresponding to the second video samples $VS2_{60}$ to $VS2_{5000}$;

S590: the network node 110 transmits the file type box of the on-demand video file VD', the first video samples $VS1_{100}$ to $VS1_{2000}$, the second video samples $VS2_{60}$ to $VS2_{5000}$, and the movie box of the on-demand video file VD' by the network communication protocol.

With the method 500, the network node 110 can fetch the required content in the first video file V1 and the second video file V2 to generating the on-demand video file VD' according to the first transmission instruction INST1 and the second transmission instruction INST2.

In addition, the versions of the first video file V1 and the second video file V2 may be different, and, thus, may support different operations. Therefore, in step S550, the network node 110 can compare the first file type box of the first video file V1 and the second file type box of the second video file V2, and generate the file type box of the on-demand video file VD' according to the comparison result. The video file of a new version can usually support the operations for the previous version. Therefore, the network node 110 can compare the first version of the first file type box of the first video file V1 and the second version of the second file type box of the second video file V2. If the first version is different from the second version, the network node 110 can generate the file type box of the on-demand video file VD' according to the first file type box or the second file type box whichever has an older version. If the first version is the same as the second version, the network node 110 can generate the file type box of the on-demand video file VD' according to the first file type box or the second file type box, ensuring that the on-demand video file VD' can be operated normally.

When the user terminal 120 receives the file type box of the on-demand video file VD', the first video samples $VS1_{100}$ to $VS1_{2000}$, the second video samples $VS2_{60}$ to $VS2_{5000}$, and the movie box of the on-demand video file VD', the user terminal 120 can combine the received data to generate the on-demand video file VD'.

With the method 500, the network node 110 does not have to transmit the unrequired part of the first video file V1 or the second video file V2 and waste the bandwidth of the network, reducing the burden of network traffic. Also, since the network node 110 can generate the data and transmit the data at the same time, the time for transmitting the on-demand video file VD' can be shortened while the network node 110 does not require additional memory space to save the temporary data of the on-demand video file VD'. Therefore, the requirement for memory space can be reduced.

In summary, the on demand video file transmission system and the method for transmitting an on-demand video file provided by the embodiments of the present invention can generate the on-demand video file according to the required content in the video files assigned by the instructions issued by the user, so the burden of network traffic can be reduced. Also, since the network node can generate the data and transmit the data at the same time, the time for transmitting the on-demand video file can be shortened while the network node does not require additional memory space to save the temporary data of the on-demand video file. Therefore, the requirement for memory space can be reduced.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for transmitting an on-demand video file comprising:
   a user terminal transmitting a first transmission instruction comprising a first initial time of a first video file to a network node, wherein the first video file supports a Moving Picture Experts Group-4 Part 14 (MP4) standard;
   the network node generating a file type box (ftyp) of an on-demand video file according to a first file type box of the first video file and the first transmission instruction;
   the network node fetching a plurality of first video samples corresponding to a time period from the first initial time to a first specific time from a first media data box (mdat) of the first video file according to the first transmission instruction and a first movie box (moov) of the first video file;
   the network node fetching metadata corresponding to the plurality of first video samples from the first movie box of the first video file;
   the network node generating a movie box of the on-demand video file according to the metadata corresponding to the plurality of first video samples;
   the network node transmitting the file type box of the on-demand video file, the plurality of first video samples, and the movie box of the on-demand video file by a network communication protocol; and
   the user terminal receiving the file type box of the on-demand video file, the plurality of first video samples, and the movie box of the on-demand video file for combining the on-demand video file.

2. The method of claim 1, wherein the first specific time is related to a first termination time of the first video file or a time of a last frame of the first video file.

3. The method of claim 1, further comprising:
   the user terminal transmitting a second transmission instruction comprising a second initial time of a second video file to the network node, wherein the second video file supports the Moving Picture Experts Group-4 Part 14 standard;
   the network node fetching a plurality of second video samples corresponding to a time period from the second initial time to a second specific time from a second media data box of the second video file according to the second transmission instruction and a second movie box of the second video file;
   the network node fetching metadata corresponding to the plurality of second video samples from the second movie box of the second video file; and
   the user terminal receives the file type box of the on-demand video file, the plurality of first video samples, the plurality of second video samples, and the movie box of the on-demand video file for combining the on-demand video file;
   wherein:
   the network node generates the file type box of the on-demand video file by comparing a second file type box of the second video file and the first file type box of the first video file;
   the network node generates the movie box of the on-demand video file according to the metadata corresponding to the plurality of first video samples and the metadata corresponding to the plurality of second video samples; and
   the network node transmits the file type box of the on-demand video file, the plurality of first video samples, the plurality of second video samples, and the movie box of the on-demand video file by the network communication protocol.

4. The method of claim 3, wherein the second specific time is related to a second termination time of the second video file or a time of a last frame of the second video file.

5. The method of claim 3, wherein the network node generates the file type box of the on-demand video file by comparing the second file type box of the second video file and the first file type box of the first video file comprises:
   comparing a first version of the first file type box and a second version of the second file type box;
   wherein if the first version is different from the second version, the network node generates the file type box of the on-demand video file according to the first file type box or the second file type box whichever has an older version; and
   wherein if the first version is the same as the second version, the network node generates the file type box of the on-demand video file according to the first file type box or the second file type box.

6. The method of claim 1, wherein the network node fetching the plurality of first video samples corresponding to the time period from the first initial time to the first specific time from the first media data box of the first video file according to the first transmission instruction and the first movie box of the first video file comprises:
   the network node deriving an initial sample serial number corresponding to the first initial time and a termination sample serial number corresponding to the first specific time according to sample display time recorded in a time to sample box (stts) of the first movie box and sample serial numbers recorded in a sync sample table box (stss) of the first movie box;
   the network node fetching at least one initial address of chunk of the plurality of first video samples according to the initial sample serial number, the termination sample serial number, and initial addresses of chunks recorded in a chunk offset box (stco) of the first movie box;
   the network node fetching an initial address corresponding to the initial sample serial number and a termination address corresponding to the termination sample serial number from the first media data box according the at least one initial address of chunk, numbers of samples in each chunk recorded in a sample to chunk box (stsc) of the first movie box, and sizes of each samples recorded in a sample size box (stsz) of the first movie box; and
   the network node fetching the plurality of first video samples corresponding to the time period from the first initial time to the first specific time from the first media data box of the first video file according to the initial address and the termination address.

7. The method of claim 1, wherein:
   once the network node fetches a video sample of the plurality of first video samples, the network node transmits the video sample to the user terminal by the network communication protocol immediately; and when the network node transmits the video sample to the user terminal by the network communication protocol, the network node continues to fetch rest of the first video samples.

8. The method of claim 1, wherein the network communication protocol is HyperText Transfer Protocol (HTTP).

9. The method of claim 1, wherein the network node is a camera, a server, a network video recorder (NVR), or a network attached storage (NAS).

* * * * *